United States Patent [19]

Kinoshita et al.

[11] Patent Number: 4,950,705
[45] Date of Patent: Aug. 21, 1990

[54] RUBBER COMPOSITIONS

[75] Inventors: Takeshi Kinoshita; Koichi Morita; Yoshiyuki Kumamoto, all of Kodaira, Japan

[73] Assignee: Bridgestone Corporation, Tokyo, Japan

[21] Appl. No.: 239,362

[22] Filed: Sep. 1, 1988

[30] Foreign Application Priority Data

Sep. 8, 1987 [JP]  Japan ................................ 62-224594
Oct. 13, 1987 [JP]  Japan ................................ 62-258152
Nov. 2, 1987 [JP]  Japan ................................ 62-275833

[51] Int. Cl.$^5$ ............................................. C08K 5/07
[52] U.S. Cl. .................................... 524/357; 524/398
[58] Field of Search .............................. 524/357, 398

[56] References Cited

U.S. PATENT DOCUMENTS 3,480,607 11/1969 Hsieh ................................ 526/335

Primary Examiner—Joseph L. Schofer
Assistant Examiner—Peter D. Mulcahy
Attorney, Agent, or Firm—Sughrue, Mion, Zinn, Macpeak & Seas

[57] ABSTRACT

Rubber compositions excellent in adhesion to metals, particularly suitable for steel cord coating rubbers, having a high vulcanizing rate and little offensive smell in an unvulcanized state, which comprise 100 parts by weight of a rubber and 0.01~1 part by weight as a cobalt element content of at least one cobalt oxyketone complex represented by the following general formula:

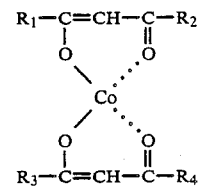

wherein $R_1 \sim R_4$ are same or different $C_{1 \sim 18}$ alkyl, $C_{5 \sim 12}$ cycloalkyl, $C_{6 \sim 14}$ aryl-$C_{1 \sim 4}$ alkyl, $C_{1 \sim 18}$ alkoxyl, $C_{5 \sim 12}$ cycloalkoxyl, $C_{6 \sim 14}$ aryloxyl, $C_{6 \sim 14}$ aryl-$C_{1 \sim 4}$ alkoxyl groups, or $C_{2 \sim 18}$ hydrocarbon groups having at least one double bond.

2 Claims, No Drawings

RUBBER COMPOSITIONS

BACKGROUND OF THE INVENTION

1. Field of the Invention

The present invention relates to rubber compositions having good metal adhesive properties, and more particularly, to rubber compositions suitable for adhering to metal which exhibit an excellent adhesion when used as a steel cord coating rubber.

2. Description of the Prior Art

Recently, a remarkable development has been attained in a so-called "steel tire" wherein steel cords are used for belts or carcass plies thereof, while diversified studies have been made of adhesion between steel cord and rubber.

In general, methods for bonding a steel cord with a rubber can be roughly classified into two groups: one of those known as an RHS bonding system which utilizes resorcinol/hexamethylene tetramine/silica, and another one wherein metal salts, particularly, cobalt salts of organic acids are compounded with the rubber. Specifically the latter, inter alia, has been widely utilized and rubber compositions compounded with metal salts have heretofore been proposed as a steel cord coating rubber. For example, in Japanese Patent Application Publication No. 56-39,828, Japanese Patent Application Laid-open No. 54-52,188, Japanese Patent Application Publications Nos. 50-33,905, 49-20,072, 52-26,276 and 54-31,511, Japanese Patent Application Laid-open No. 58-89,631, etc., there are disclosed rubber compositions wherein cobalt naphthenate, cobalt stearate, cobalt oleate, cobalt tallate, cobalt resinate or the like is compounded as an adhesion promoter.

Further, Japanese Patent Application Publication No. 56-19,820 discloses a rubber composition compounded with cobalt acetylacetonate.

Meanwhile, demands for safety, high speed traveling properties, durabilities, etc. of automotive tires have recently been more and more increasing so that the above conventional techniques do not always provide an adhesion satisfactory enough.

Namely, in tires reinforced with steel cords, heat generated during running induces deterioration of bonding force between the steel cords and rubber, causing a fatal break-down of the tires. However, according to the conventional techniques, a satisfactory thermoresistant adhesion is not obtainable.

Alternatively, from the standpoint of rationalization and energy saving in manufacturing processes, a rapid vulcanization is material. Therefore, adhesion promoters have become required for promoting adhesion of rubbers to steel cords not only to improve the thermoresistant adhesion but also to augment an initial bonding strength. However, adhesion promoters to meet these required characteristics have never been proposed.

The cobalt acetylacetonate compounded rubber compositions described in Japanese Patent Application Publication No. 56-19,820 can provide relatively a high bonding strength. However, these rubber compositions have such drawbacks as a low vulcanizing rate and an offensive smell of unvulcanized rubber compositions.

SUMMARY OF THE INVENTION

As a result of repeated assiduous researches to find out an adhesion promoter to be compounded with rubber compositions which exhibits conspicuously a high effect of improvements in thermoresistant adhesion and initial adhesion of the rubber compositions, as compared with conventional cobalt naphthenate, etc. and also can provide the resulting rubber compositions with a high vulcanizing rate and little emission of the offensive smell, as compared with cobalt acetylacetonate, we, the inventors, have found that by utilizing specified cobalt oxyketone complexes remarkable improvements can be achieved both in thermoresistant adhesion and initial adhesion of rubber compositions and that the resulting rubber compositions have a high vulcanizing rate and little emission of offensive smells. Thus, the present invention has been eventually accomplished.

Accordingly, an object of the present invention is, obviating the above-described drawbacks of the prior art, to provide rubber compositions suitable for adhering to metals which are excellent in both thermoresistant adhesion and initial adhesion as well as high in vulcanizing rate and no offensive smells in an unvulcanized state.

The above object is attained by a rubber composition excellent in adhesion to metals which is characterized by comprising 100 parts by weight of a rubber and $0.01 \sim 1$ part by weight as a cobalt element content of at least one cobalt oxyketone complex compounded in said rubber, which complex is represented by the following general formula (I):

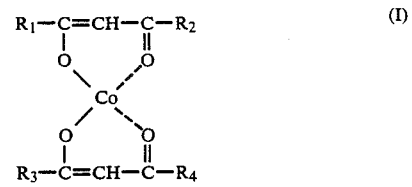

wherein $R_1$, $R_2$, $R_3$ and $R_4$ are same or different $C_1 \sim C_{18}$ alkyl, $C_5 \sim C_{12}$ cycloalkyl, $C_6 \sim C_{14}$ aryl, $C_6 \sim C_{14}$ aryl-$C_1 \sim C_4$ alkyl, $C_1 \sim C_{18}$ alkoxyl, $C_5 \sim C_{12}$ cycloalkoxyl, $C_6 \sim C_{14}$ aryloxyl, $C_6 \sim C_{14}$ aryl-$C_1 \sim C_4$ alkoxyl groups, or $C_2 \sim C_{18}$ hydrocarbon groups having at least one double bond and, however, total number of carbon atOms in $R_1$, $R_2$, $R_3$ and $R_4$ is at least 5.

In a preferable embodiment of the rubber compositions according to the present invention, $R_2$ and $R_4$ in the formula (I) are both methyl group and $R_1$ and $R_3$ are same or different groups represented by the following formulae (II) and (III), respectively:

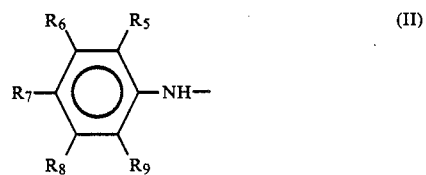

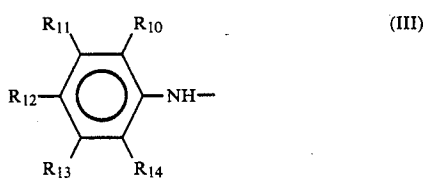

wherein $R_5 \sim R_{14}$ are same or different, hydrogen atom, $C_1 \sim C_{18}$ alkyl, $C_5 \sim C_{12}$ cycloalkyl, $C_6 \sim C_{14}$ aryl, $C_6 \sim C_{14}$ aryl-$C_1 \sim C_4$ alkyl, $C_1 \sim C_{18}$ alkoxyl, $C_5 \sim C_{12}$ cycloalkoxyl, $C_6 \sim C_{14}$ aryloxyl, $C_6 \sim C_{14}$ aryl-$C_1 \sim C_4$ alkoxyl groups, or $C_2 \sim C_{18}$ hydrocarbon groups having at least one double bond.

DETAILED DESCRIPTION OF THE INVENTION

The present invention will be explained in more detail hereinafter.

Rubbers composing the rubber compositions of the present invention are sulphur-vulcanizable. Materially, mention may be made of natural rubbers, polyisoprene rubbers, polybutadiene rubbers, styrene/butadiene copolymer rubbers, isoprene/isobutylene copolymer rubbers, halides thereof, ethylene/propylene/diene terpolymer rubbers (EPDM), butadiene/propylene copolymer rubbers, butadiene/ethylene copolymer rubbers, butadiene/isoprene copolymer rubbers, polypentenamer and the like, or blends thereof. The natural rubbers, polyisoprene rubbers, polybutadiene rubbers, styrene/butadiene copolymer rubbers and blends thereof, among the others, are particularly preferred because of a high versatility.

In the present invention, the cobalt oxyketone complexes to be compounded with such rubbers are represented by the above general formula (I). As embodiments of $R_1$, $R_2$, $R_3$ and $R_4$ in the above formula (I), mention may be made of methyl, ethyl, propyl, isopropyl, n-butyl, tert-butyl, n-pentyl, isopentyl, sec-pentyl, neopentyl, n-hexyl, isohexyl, sec-hexyl, cyclohexyl, n-heptyl, isoheptyl, tert-heptyl, octyl, 2-ethylhexyl, nonyl, decyl, undecyl, dodecyl, tridecyl, tetradecyl, pentadecyl, hexadecyl, heptadecyl, octadecyl, methylcyclohexyl, cyclohexylmethyl, naphthyl, anthracenyl, naphthylmethyl, cycloheptyl, cyclooctyl, phenyl, benzyl, cyclononyl, cyclodecyl, cycloundecyl, cyclododecyl, 9-octadecenyl, methylphenyl and the like. Particularly, among the others, combinations such that the total number of carbon atoms of $R_1$, $R_2$, $R_3$ and $R_4$ is at least 10 are preferable.

Further, in the above-described formulae (II) and (III) representing $R_1$ and $R_3$, respectively, the substituent groups, $R_5 \sim R_{14}$, can be hydrogen atom in addition to the groups same as the above.

These cobalt oxyketone complexes can be obtained, for example, by adding an oxyketone compound to sodium hydroxide aqueous solution followed by a further reaction with cobalt chloride, in accordance with the following reaction formulae:

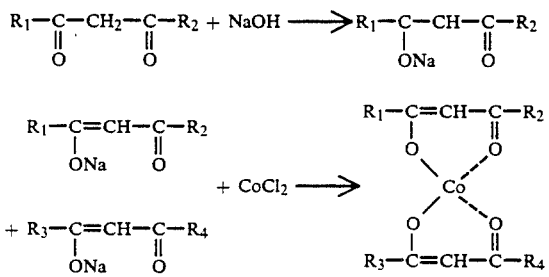

wherein difinitions of $R_1$, $R_2$, $R_3$ and $R_4$ are same as those of the general formula (I).

Further, the preferable cobalt oxyketone complexes represented by the above formula (I) wherein $R_1$ and $R_3$ are substituted with the groups represented by the aforementioned formulae (II) and (III), respectively, and $R_2$ and $R_4$ are both methyl group, also can be obtained in accordance with the following reaction formulae similar to the above:

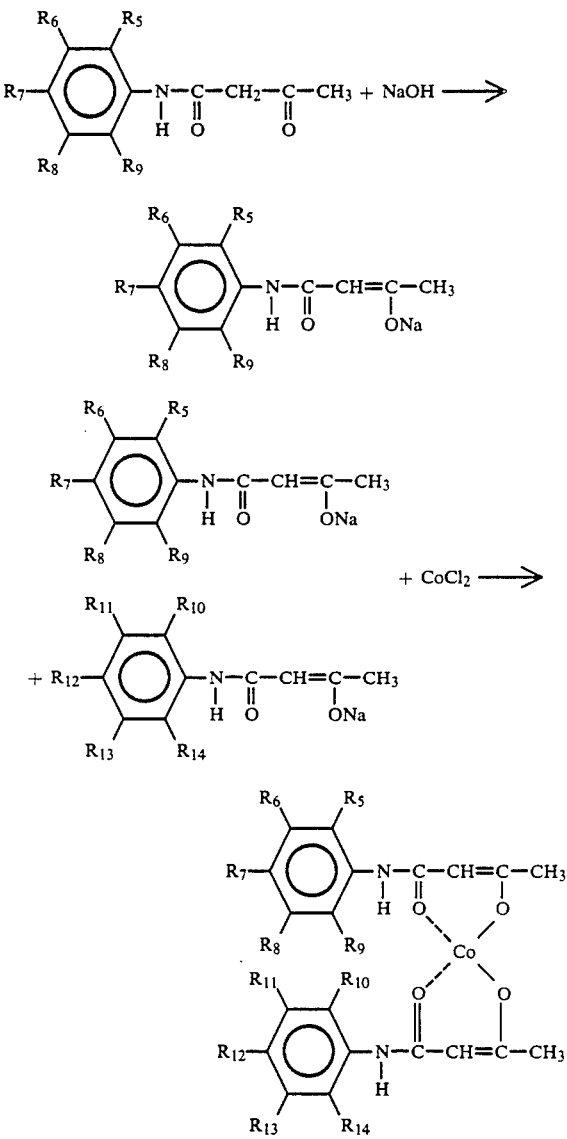

wherein difinitions of $R_5 \sim R_{14}$ are same as those of the general formulae (II) and (III).

In the present invention, the cobalt oxyketone complexes are compounded in an amount of $0.01 \sim 1$ part as a cobalt element content with 100 parts of rubber by weight. If the amount is less than 0.01 part by weight, sufficient effects can not be expected, while compounding in excess of 1 part by weight is not preferable not only for possibly causing deterioration of physical properties of the rubber but also from an economical point of view. In the present invention, the cobalt element content is preferred particularly to be $0.05 \sim 0.5$ part by weight.

Additionally, the rubber compositions of the present invention may contain, according to purposes, various compounding additives beginning with sulphur as a vulcanizing agent, in addition to the above-described cobalt oxyketone complexes. The sulphur as a vulcanizing agent is preferred to be in an amount of about $0.5 \sim 10$ parts per 100 parts of rubber, by weight. As other compounding additives, those usually employed in the rubber industry, for example, reinforcements or fillers, such as carbon black, silica, calcium carbonate or the like; softeners such as aromatic oils; vulcanizing accelerators; vulcanizing accelerating aids; age resistant agents; and the like, can be arbitrarily compounded, if required, in a range of usual amount of compounding.

Such rubber compositions according to the present invention are suitably employed in adhesion particularly to metals, and preferably used as a coating composition for steel belts, steel breakers, steel carcass plies or the like, of tires. In addition, they are applicable in industrial articles other than tires, for example, conveyer belts, rubber vibration isolators, or the like.

The present invention will be explained in more detail hereinafter with reference to manufacturing examples of cobalt oxyketone complexes, examples and comparative examples. However, this invention should not be understood to be limited by the following examples insofar as falling in the scope of the appended claims.

Additionally, in the examples, evaluation methods of vulcanizing properties, initial adhesion, thermoresistant adhesion and smells of unvulcanized rubbers are as follows:

Vulcanizing property

Using unvulcanized rubber compositions, a vulcanizing rate T (90) was determined in accordance with ASTM D 2084.

Initial adhesion

A steel cord/rubber composite consisting of an unvulcanized rubber embedding a steel cord of 1 mm×5 mm×0.23 mm with brass-plated surfaces was vulcanized at 145° C. for 20 minutes. Then, a test of peeling the steel cord off the embedding rubber was conducted in accordance with JIS K 6301, peeling test. The adhesion was evaluated by the amount of rubber remaining on the cord. A condition wherein the cord was completely covered by the rubber was denoted as 100, and a condition wherein no rubber remained as adhered was denoted as 0.

Thermoresistant adhesion

A steel cord/rubber composite similar to that used in the initial adhesion test was left to stand for 7 days in an oven at 120° C. Then the adhesion was evaluated in the same manner as that for the initial adhesion, except that the vulcanizing time of the composite was 40 minutes.

Smell of unvulcanized rubber

The smell was evaluated during a kneading operation with a Banbury mixer.

○ : a smell, not particularly offensive.
Δ : a smell, offensive but tolerable.
x : a smell, offensive and intolerable.

Manufacturing Example 1

(Synthesis of 2,4-octanedione cobalt complex)

Four grams (0.1 mol) of sodium hydroxide were dissolved in 150 cc of water. To this solution, 14.2 g (0.1 mol) of 2,4-octanedione were added slowly while stirring. After the dissolution had been completed, the obtained solution was dripped taking 10 minutes while vigorously stirring into a cobalt (II) chloride aqueous solution which had been prepared in advance by dissolving 11.9 g (0.05 mol) of hexahydrated cobalt (II) chloride in 200 cc of water. The produced rose-red-colored precipitate was separated by filtration and washed with water until the washing water became substantially colorless, followed by vacuum drying to obtain 15.1 g of the object: 2,4-octanedione cobalt complex.

Manufacturing Examples 2~6

In the same manner as Manufacturing Example 1 except that 5,7-undecanedione (Manufacturing Example 2), 2,4-undecanedione (Manufacturing Example 3), 2,4-pentadecanedione (Manufacturing Example 4), 2,4-heneicosanedione (Manufacturing Example 5) and 1-phenyl-1,3-butanedione (Manufacturing Example 6) were used in lieu of 2,4-octanedione, cobalt complexes of 5,7-undecanedione, 2,4-undecanedione, 2,4-pentadecanedione, 2,4-heneicosanedione and 1-phenyl-1,3-butanedione were synthesized, respectively.

Examples 1~6, and Comparative Examples 1~4

Eighty parts by weight of a natural rubber, 20 parts by weight of a synthetic polyisoprene rubber (IR 2200), 50 parts by weight of carbon black, 8 parts by weight of zinc white, 3 parts by weight of sulphur, 0.5 part by weight of a vulcanization accelerator (sulfeneamide) were compounded with 0.2 part by weight as a cobalt element content of various cobalt oxyketone complexes shown in Table 1 (Examples 1~6) and the mixture were kneaded in a Banbury mixer to prepare respective rubber compositions.

With respect to the obtained rubber compositions, vulcanizing properties, initial adhesion, thermoresistant adhesion were evaluated.

Additionally, for comparative purpose, the same evaluation was made of those compounded with hitherto known cobalt naphthenate (Comparative Example 1), cobalt stearate (Comparative Example 2), Manobond C (Comparative Example 3), cobalt acetylacetonate (Comparative Example 4), respectively, in lieu of the cobalt oxyketone complex.

The result is shown in Table 1.

TABLE 1(a)

| | Example | | | | | |
|---|---|---|---|---|---|---|
| | 1 | 2 | 3 | 4 | 5 | 6 |
| Cobalt Complex | 2,4-octane-dione cobalt complex (Manufacturing Example 1) | 5,7-un-decanedione cobalt complex (Manufacturing Example 2) | 2,4-un-decanedione cobalt complex (Manufacturing Example 3) | 2,4-pentadecane-dione cobalt complex (Manufacturing Example 4) | 2,4-heneicosane-dione cobalt complex (Manufacturing Example 5) | 1-phenyl-1,3-butanedione cobalt complex (Manufacturing Example 6) |
| Vulcanizing Rate (min.) T(90) at 155° C. | 9.4 | 7.0 | 7.2 | 7.0 | 7.5 | 7.8 |
| Initial Adhesion | 90 | 85 | 88 | 85 | 85 | 89 |
| Thermoresistant | 70 | 70 | 70 | 67 | 65 | 70 |

TABLE 1(a)-continued

| | Example | | | | | |
|---|---|---|---|---|---|---|
| | 1 | 2 | 3 | 4 | 5 | 6 |
| Cobalt Complex | 2,4-octane-dione cobalt complex (Manufacturing Example 1) | 5,7-un-decanedione cobalt complex (Manufacturing Example 2) | 2,4-un-decanedione cobalt complex (Manufacturing Example 3) | 2,4-pentadecane-dione cobalt complex (Manufacturing Example 4) | 2,4-heneicosane-dione cobalt complex (Manufacturing Example 5) | 1-phenyl-1,3-butanedione cobalt complex (Manufacturing Example 6) |
| Adhesion | | | | | | |

TABLE 1(b)

| | Comparative Example | | | |
|---|---|---|---|---|
| | 1 | 2 | 3 | 4 |
| Cobalt Complex | Cobalt naphthenate | Cobalt stearate | Manobond C* | Cobalt acetyl-acetonate |
| Vulcanizing Rate (min.) T(90) at 155° C. | 8.0 | 8.2 | 8.5 | 10.0 |
| Initial Adhesion | 50 | 60 | 65 | 90 |
| Thermoresistant Adhesion | 40 | 50 | 35 | 70 |

*manufactured by Manchen, England

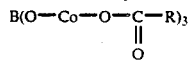

As is clear from Table 1, the rubber compositions according to the present invention with which the cobalt oxyketone complex was compounded were high in vulcanizing rate and conspicuously excellent both in initial adhesion and thermoresistant adhesion.

Manufacturing Example 7

(Synthesis of acetoacetanilide cobalt complex)

Four grams (0.1 mol) of sodium hydroxide were dissolved in 150 cc of water. To this solution, 17.7 g (0.1 mol) of acetoacetanilide were added while stirring. After the dissolution had been completed, the obtained solution was dripped taking 10 minutes while vigorously stirring into a cobalt (II) chloride aqueous solution which had been prepared in advance by dissolving 11.9 g (0.04 mol) of hexahydrated cobalt (II) chloride in 20 cc of water. Then, the produced precipitate was separated by filtration and washed with 200 cc of water, followed by vacuum drying to obtain 19.0 g of the object: acetoacetanilide cobalt complex.

Manufacturing Examples 8~11

In the same manner as Manufacturing Example 7 except that acetoacetyl p-toluidide (Manufacturing Example 8), acetoacetyl m-xylidide (Manufacturing Example 9), acetoacetyl o-anisidide (Manufacturing Example 10) and acetoacetyl o-chloroanilide (Manufacturing Example 11) were used in lieu of acetoacetanilide, cobalt complexes of acetoacetyl p-toluidide, acetoacetyl m-xylidide, acetoacetyl o-anisidide and acetoacetyl o-chloroanilide were synthesized, respectively.

Examples 7~11, and Comparative Examples 5~8

Eighty parts by weight of a natural rubber, 20 parts by weight of a synthetic polyisoprene rubber (IR 2200), 50 parts by weight of carbon black, 8 parts by weight of zinc white, 3 parts by weight of sulphur, 0.5 part by weight of a vulcanization accelerator (sulfenamide) were compounded with 0.2 part by weight as a cobalt element content of various cobalt oxyketone complexes shown in Table 2 (Manufacturing Examples 7~11) and the mixtures were kneaded in a Banbury mixer to prepare respective rubber compositions.

With respect to the obtained rubber compositions, initial adhesion, thermoresistant adhesion and smells of unvulcanized rubbers were evaluated.

Additionally, for comparative purpose, the same evaluation was made of those compounded with hitherto known cobalt naphthenate (Comparative Example 5), cobalt stearate (Comparative Example 6), Manobond C (Comparative Example 7), cobalt acetylacetonate (Comparative Example 8), respectively, in lieu of the cobalt oxyketone complex.

The result is shown in Table 2.

TABLE 2(a)

| | Example | | | | |
|---|---|---|---|---|---|
| | 7 | 8 | 9 | 10 | 11 |
| Cobalt Complex | Aceto-acetanilide cobalt complex (Manufacturing Example 7) | Acetoacetyl p-toluidide cobalt complex (Manufacturing Example 8) | Acetoacetyl m-xylidide cobalt complex (Manufacturing Example 9) | Acetoacetyl o-anisidide cobalt complex (Manufacturing Example 10) | Acetoacetyl o-chloroanilide cobalt complex (Manufacturing Example 11) |
| Initial Adhesion | 89 | 90 | 92 | 90 | 85 |
| Thermoresistant Adhesion | 69 | 70 | 71 | 68 | 65 |
| Smell of Unvulcanized Rubber | ◯ | ◯ | ◯ | ◯ | ◯ |

TABLE 2(b)

|  | Comparative Example | | | |
| --- | --- | --- | --- | --- |
| Cobalt Complex | 5 Cobalt naphthenate | 6 Cobalt stearate | 7 Manobond C | 8 Cobalt acetylacetonate |
| Initial Adhesion | 50 | 60 | 63 | 90 |
| Thermoresistant Adhesion | 40 | 50 | 35 | 70 |
| Smell of Unvulcanized Rubber | Δ | ○ | Δ | x |

As is clear from Table 2, the rubber compositions according to the present invention with which the cobalt oxyketone complex was compounded had no offensive smells in an unvulcanized state and were conspicuously excellent both in initial adhesion and thermoresistant adhesion.

As explained in detail above, the rubber compositions excellent in adhesion to metals according to the present invention which comprise a rubber and a specified cobalt oxyketone complex compounded therewith in a specified amount, are extremely high in vulcanizing rate and remarkably improved in both initial adhesion and thermoresistant adhesion.

Accordingly, the rubber compositions according to the present invention are very effective for adhering to articles to be exposed to high temperatures, and further allow the articles to be produced efficiently by virtue of the excellent initial adhesion and vulcanizing characteristics.

Such rubber compositions of the present invention are very useful particularly as a rubber for adhering to steel cords.

In view of the fact that the invention is susceptible to modifications according to individual preference or conditions without departing from the spirit of this disclosure and the scope of the appended claims, it is not intended to have the invention limited to or circumscribed by the specific details of procedure, materials, proportions hereinabove set forth by way of examples.

What is claimed is:

1. A rubber composition for adhesion to metals which comprises 100 parts by weight of a rubber and $0.01 \sim 1$ part by weight as a cobalt element content of at least one cobalt oxyketone complex compounded with said rubber, which complex is represented by the following general formula:

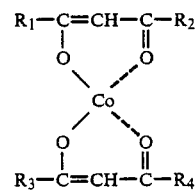

wherein $R_1$, $R_2$, $R_3$ and $R_4$ are same or different $C_1 \sim C_{18}$ alkyl, $C_5 \sim C_{12}$ cycloalkyl, $C_6 \sim C_{14}$ aryl, $C_6 \sim C_{14}$ aryl-$C_1 \sim C_4$ alkyl, $C_1 \sim C_{18}$ alkoxyl, $C_5 \sim C_{12}$ cycloalkoxyl, $C_6 \sim C_{14}$ aryloxyl, $C_6 \sim C_{14}$ aryl-$C_1 \sim C_4$ alkoxyl groups, or $C_2 \sim C_{18}$ hydrocarbon groups having at least one double bond and, however, total number of carbon atoms in $R_1$, $R_2$, $R_3$ and $R_4$ is at least 5.

2. A rubber composition as claimed in claim 1, wherein said cobalt oxyktone complex is compounded in an amount of $0.05 \sim 0.5$ part by weight as a cobalt element content.

* * * * *